(12) United States Patent
Azagury et al.

(10) Patent No.: US 8,745,295 B2
(45) Date of Patent: Jun. 3, 2014

(54) DEVICE, METHOD AND COMPUTER PROGRAM PRODUCT FOR EXECUTING A MIGRATED EXECUTION CONTEXT BY A STORAGE CONTROLLER

(75) Inventors: Alain Charles Azagury, Haifa (IL); Shmuel Ben-Yehuda, Haifa (IL); Michael E. Factor, Haifa (IL); Ilan Shimony, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 966 days.

(21) Appl. No.: 11/673,599

(22) Filed: Feb. 12, 2007

(65) Prior Publication Data

US 2008/0196026 A1    Aug. 14, 2008

(51) Int. Cl.
*G06F 3/00* (2006.01)

(52) U.S. Cl.
USPC ............................................. 710/74

(58) Field of Classification Search
None
See application file for complete search history.

(56) References Cited

U.S. PATENT DOCUMENTS

| | | | |
|---|---|---|---|
| 6,226,734 B1 * | 5/2001 | Kleinsorge et al. | 712/13 |
| 6,266,745 B1 * | 7/2001 | de Backer et al. | 711/147 |
| 7,085,883 B1 | 8/2006 | Dalgic et al. | 711/114 |
| 7,383,405 B2 * | 6/2008 | Vega et al. | 711/162 |
| 7,428,624 B2 * | 9/2008 | Fujita et al. | 711/170 |
| 2004/0111511 A1 * | 6/2004 | Maeda et al. | 709/224 |
| 2006/0005189 A1 | 1/2006 | Vega et al. | 718/1 |
| 2006/0230407 A1 | 10/2006 | Rosu et al. | 718/105 |
| 2007/0220121 A1 * | 9/2007 | Suwarna | 709/220 |
| 2007/0240143 A1 * | 10/2007 | Guminy et al. | 717/168 |
| 2008/0104587 A1 * | 5/2008 | Magenheimer et al. | 718/1 |
| 2008/0222638 A1 * | 9/2008 | Beaty et al. | 718/100 |

OTHER PUBLICATIONS

The MOSIX Direct File System Access Method for Supporting Scalable Cluster File Systems, Lior Amar, 2003, p. 1-17.*
M. Malkawi et al., "Process migration in virtual memory multicomputer systems", Proceeding of the Twenty-Sixth Hawaii International Conference on System Sciences (Cat. No. 93TH0501-7), 1993, 90-8 vol. 2.
C. Clark et al., "Live Migration of Virtual Machines", NDSI 2005. Available at: http://www.usenix.org/events/nsdi05/tech/full_papers/clark/clark.pdf.
L. Amar et al., "The MOSIX Direct File system Access Method for supporting Scalable Cluster File Systems", 2004. Available at: http://www.mosix.org/pub/dfsa.pdf.

* cited by examiner

*Primary Examiner* — Henry Tsai
*Assistant Examiner* — Juanito Borromeo

(57) ABSTRACT

A method for executing a migrated execution context by a storage controller, the method includes: determining, by a management entity, to migrate an execution context from a source computer to the storage controller in response to a fulfillment of a first criterion; and migrating the execution context to the storage controller; wherein the source computer is coupled to the storage controller.

17 Claims, 4 Drawing Sheets

DEVICE, METHOD AND COMPUTER PROGRAM PRODUCT FOR EXECUTING A MIGRATED EXECUTION CONTEXT BY A STORAGE CONTROLLER

FIELD OF THE INVENTION

The present invention relates to a method, a device and a computer program product for executing a migrated execution context by a storage controller.

BACKGROUND OF THE INVENTION

Storage controllers are dedicated devices that control the access to multiple storage units such as disks, tapes and the like. A storage controller can receive requests to retrieve information and in return provide information to one or more clients (such as computer) over a communication link. The communication link can belong to a storage area network (SAN). The storage controller can only receive Input/Output (IO) requests.

The throughput (also referred to as IO performance) of a storage controller is very important. The storage controller throughput is affected by various parameters including but not limited to a load imposed on the SAN. The power consumption of the storage controller and the time of executing IO-bounds tasks is also important.

There is a growing need to improve the performances of storage controllers.

SUMMARY OF THE PRESENT INVENTION

A method for executing a migrated execution context by a storage controller, the method includes: determining, by a management entity, to migrate an execution context from a source computer to the storage controller in response to a fulfillment of a first criterion; and migrating the execution context to the storage controller; wherein the source computer is coupled to the storage controller.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

Figure 1:
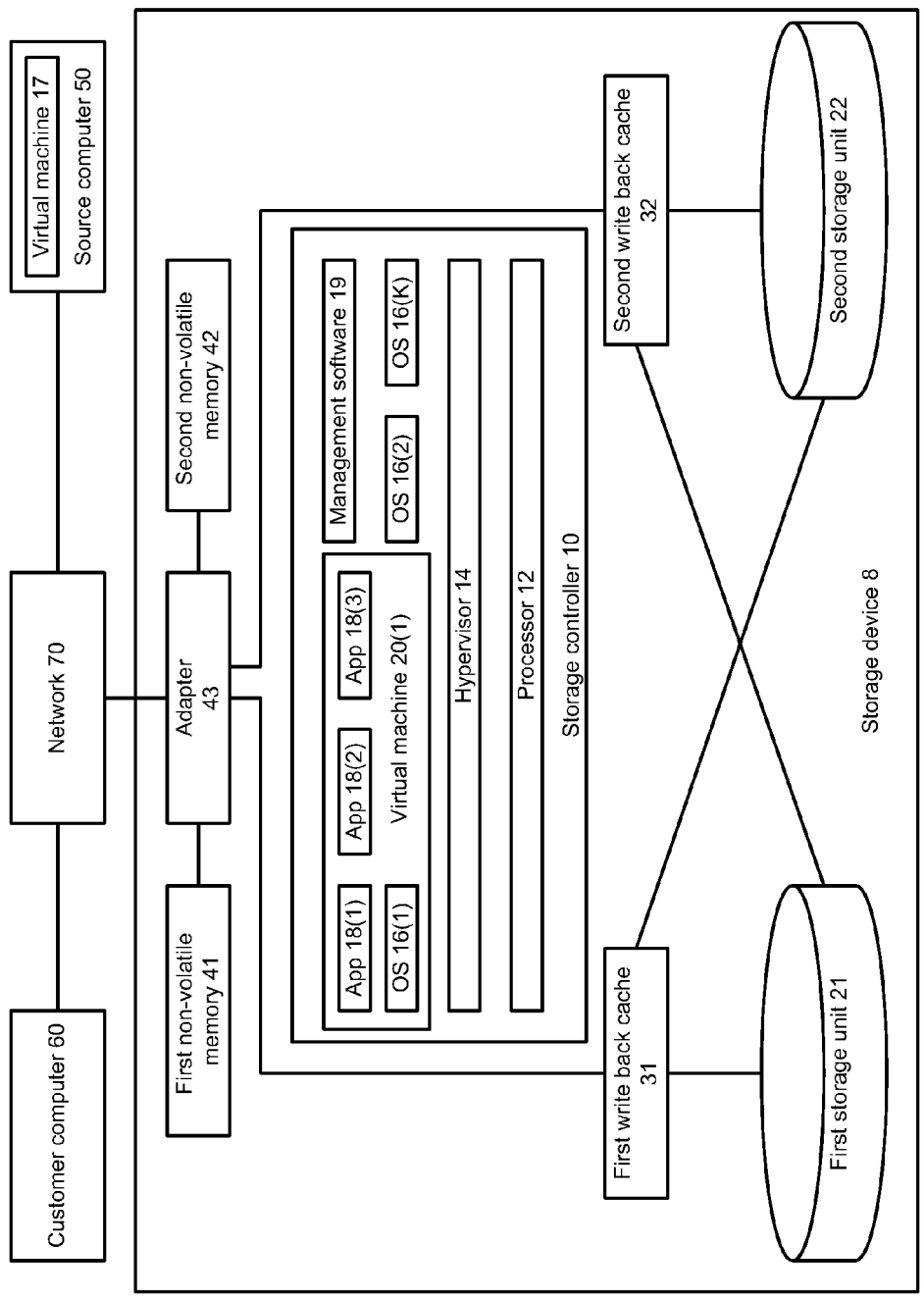
FIG. 1 illustrates a storage controller, according to an embodiment of the invention.

According to an embodiment of the invention a storage controller includes a processor that has execution context migration capabilities. Conveniently, the term "execution context migration" represents a virtual machine migration or a group of processes migration. The group of processes includes at least one process. Accordingly an execution context includes a virtual machine or a group of processes.

According to various embodiments of the invention a management entity is provided. The management entity can decide when to migrate a virtual machine or a group of processes from a source computer (that is connected to a storage controller) to the storage controller and when to migrate the virtual machine or the group of processes back to the source computer. Conveniently, the management entity is installed on (or included within) the storage controller. Alternatively, the management entity is installed on (or included within) the source computer. Yet according to another embodiment of the invention the management entity is installed on (or is included within) another unit or device that differs from the source computer and the storage controller. The source computer is a computer that can execute the virtual machine or the group of processes prior to the migration of that virtual machine or group of processes to the storage controller. The migration of the virtual machine or group of processes to the storage controller typically involves sending to the storage controller state information reflecting the state of the migrated virtual machine or the migrated group of processes.

According to various embodiments of the invention the management entity decides about a migration of the virtual machine or of the group of processes in response to an expected improvement (due to the migration) of the storage controller throughput, to available (computational and/or memory) resources of the storage controller, an expected penalty associated with the migration, power consumption reduction, time to completion of a computational IO-bound tasks, and the like. The penalty can reflect the migration period, temporal shutdown (or performance degradation) associated with the migration, bandwidth required for the migration and the like.

Conveniently, a storage controller is provided. The storage controller includes a processor and a storage unit. The storage controller is adapted to receive from a source computer, in response to a fulfillment of a first criterion, state information representative of a state of a migrated execution context (such as a virtual machine or a group of processes), and the processor is adapted to execute the migrated execution context. Optionally, the storage controller is adapted to participate in a determination of a migration of the execution context from the source computer in response to a fulfillment of a first criterion. The storage unit can be a non-volatile memory unit, a write-back cache unit or another memory unit accessible to the processor.

FIG. 1 illustrates storage controller 10 and its environment according to an embodiment of the invention.

Storage controller 10 is included within storage device 8. Storage device 8 can be connected to multiple computers over one or more networks. A network may include one of more communication channels or links. These computers can include source computers that can participate in a migration of a virtual machine or of a group of processes to storage controller 10. These computers can include computers such as customer computers that send requests to receive a service over a network. For simplicity of explanation FIG. 1 illustrates a single source computer 50 and a single customer computer 60 that are connected to storage device 8 by network 70. Network 70 can be a storage access network. It is noted that a single computer can function as a source computer as well as a customer computer.

Storage controller 10 includes a processor 12 that can execute hypervisor 14, multiple operating systems ("OS") 16(1)-16(K) and various applications ("App") 18(1)-18(L). An operating system and one or more applications that run over that operating system define a virtual machine. For example, virtual machine 20(1) includes operating system 16(1) and applications 18(1)-18(3).

Conveniently, storage controller 10 has virtual machine migration capabilities. Especially, hypervisor 14 has virtualization capabilities that enable storage controller 10 to perform a migration of a virtual machine.

Processor 12 can be a general-purpose processor such as but not limited to a Xeon™ processor of Intel™, a PowerPC™ processor of IBM™, an equivalent processor of AMD™ or any other processor that can participate in a virtual machine or a group of processes migration. For example, some of the mentioned above processors can execute a hypervisor (such as but not limited to the Xen™ hypervisor) that is able of participating in a virtual machine migration. It is further noted that these processors can also execute operating systems that support group of processes migration. These operating systems can include AIX or Linux operating systems, but this is not necessarily so.

The groups of processes run inside a single operating system. Their migration can be supported by a processor that executes an operating system and does not necessarily execute a virtual machine.

Storage device 8 includes (in addition to storage controller 10) first write-back cache unit 31, second write-back cache unit 32, first non-volatile memory 41, second non-volatile memory 42, and adaptor 43. Storage controller 10 controls the storage of data at first storage unit 21 and at second storage unit 22 and also controls the retrieval of data from first and second storage data units 21 and 22.

Storage device 8 includes two parts that are substantially mutually independent. One part backups the other part. The first part of storage device 8 includes first non-volatile memory 41, first write-back cache unit 31 and first storage unit 21. The second part of storage device 8 includes second non-volatile memory 42, second write-back cache unit 32 and second storage unit 22.

Storage controller 10 is connected to first write-back cache unit 31, second write-back cache unit 32, first non-volatile memory 41 and second non-volatile memory 42. Adapter 43 is connected to first write-back cache unit 31, second write-back cache unit 32, first non-volatile memory 41 and second non-volatile memory 42.

First storage unit 21 is connected to first write-back cache unit 31 and to second write-back cache unit 32. Second storage unit 22 is connected to first write-back cache unit 31 and to second write-back cache unit 32.

Data that is sent to first write-back cache unit 31 is also sent to second non-volatile memory 42. Data that is sent to second write-back cache unit 32 is also sent to first non-volatile memory 41.

In addition, each of the first storage unit 21 and the second storage unit 22 can store data from first write-back cache unit 31 as well as from second write-back cache unit 32.

Those of skill in the art will appreciate that storage device 8 can include more than two parts (include more than two storage units and optionally include more than two non-volatile memory units and more than two write back cache units) and that storage device 8 can also include only a single part (a single storage unit and optionally a single write-back cache unit and a single non-volatile memory unit). It is further noted that storage device 8 can include multiple storage controllers. According to another embodiment of the invention more than two storage units can be controller by storage controller 10. Yet according to another embodiment of the invention storage device 8 can include parts that do not backup other parts.

Additionally or alternatively, storage controller 10 can also include a management hardware unit and/or can be capable of executing a management software or firmware. For simplicity of explanation it is assumed that processor 12 of storage controller 10 can execute management software 19. Management software 19 can determine when to migrate a virtual machine or a group of processes from source computer 50 to storage controller 10 and when to migrate the virtual machine or the group of processes back to source computer 50.

For example, assuming that source computer executes virtual machine 17, management software 19 can decide when to migrate virtual machine 17 to storage controller 10 and when to migrate virtual machine 17 back to source computer 50.

Conveniently, a virtual machine or a group of processes is migrated when a first criterion is fulfilled. According to an embodiment of the invention the first criterion reflects an expected improvement of the throughput of the storage controller to be gained by the migration. Typically, a throughput improvement can be gained when the virtual machine or the group of processes require multiple transfer of data between storage device 8 and another computer, such as source computer 50 or customer computer 60. For example, if virtual machine 17 includes a virus scan application that should scan first storage unit 21 a substantial throughput gain can be achieved by executing virtual machine 17 by storage controller 10. Yet for another example, the first criterion can be responsive to an expected power consumption reduction or to an expected decrement in a time to completion of a computational IO-bound tasks, and the like.

The first criterion can further reflect an expected migration penalty. Conveniently, processor 12 can start executing the migrated virtual machine or group of processes after at least a portion of state information representative of the state of the virtual machine or the group of processes is received by storage controller 10.

Conveniently, if the management entity (such as management software 19) is at least partially included in storage controller 10 then storage controller 10 can participate in a determination of migrating the migrated execution context from storage controller 10 to source computer 50 in response to a fulfillment of a second criterion. The second criterion can reflect other processes that can be migrated to storage controller 10, can reflect an end of IO operations or at least a substantial decrement in IO operations, and the like.

It is noted that management software 19 can be alternatively installed on source computer 50, but this is not necessarily so. Yet according to an embodiment of the invention a management entity is partially installed on storage controller 10 and partially installed on source computer 50. Yet according to another embodiment of the invention a management entity is installed on (or included within) a device that differs from source computer 50 and storage controller 10.

Conveniently, management software 19 can determine the available resources of storage controller 10, such as available computational resources of processor 12, and available storage space of a memory unit out of first and second write back caches 31 and 32 or non-volatile memory units 41 and 42.

Management software 19 can also receive (or determine) a penalty associated with a migration of a virtual machine or a group of processes. Management software 19 can also receive (or determine) an expected improvement (due to the migration) of the storage controller throughput. The mentioned above information can be generated based upon previous migration attempts, based upon the type of execution context to be migrated (for example—whether the execution context includes a virus scan process that can greatly benefit from being executed by storage controller 10), and the like. It is noted that management software 19 can take into account additional or alternative considerations such as an expected power consumption reduction, an expected decrement in a time to completion of a computational IO-bound tasks, and the like.

Additionally or alternatively, management software 19 can apply various well known methods for determining when to perform a virtual machine or a group of processes migration. A well known method is illustrated in the following article, which is incorporated herein by reference: "The MOSIX Direct File System Access Method for Supporting Scalable Cluster File Systems.—Amar L., Barak A. and Shiloh A. Cluster Computing (7) 2, pp. 141-150, April 2004.

Conveniently, management software 19 will tend to perform a migration process the higher the ratio between consumption of IO resources and consumption of other resources required for executing a virtual machine or a group of processes. In addition, if storage controller 10 has more available computational and memory resources, the execution of the virtual machine or group of processes (by storage controller 10) can be more effective. These IO resources represent data transfers between storage device 12 and other computers, such as but not limited to source computer 50.

According to an embodiment of the invention an evaluation whether to perform a migration process can be responsive to a request to access storage controller 10, to an intent to start an execution of a certain process by source computer 50, to load imposed on network 70, to a current throughput level of storage controller 10, and the like. It is noted that the throughput of storage controller 10 can be monitored and analyzed in order to assist in future migration processes. The analysis can indicate whether a migration process was successful, whether the estimated penalty and estimated benefits gained from the migration process were accurate, and the like.

According to an embodiment of the invention storage controller 10 can perform (or participate in) cold migration and/or live migration. A cold migration of a virtual machine includes checkpointing the virtual machine to provide state information representative of the state of the virtual machine, moving the state information from source computer 50 to storage controller 10 and then restarting the virtual machine at storage controller 10. "Live" or "hot" migration involves copying most of the state information while the virtual machine continues running on source computer 50, and then stopping it for the minimal amount of time necessary to complete a consistent copy of the state information. The same applied to migration of a group of processes.

It is noted that storage controller 10 can perform virtual machine migration by applying at least one of the following techniques: push, stop-and-copy, or pull, pre-copy as well as any other migration phase illustrated in "Live migration of virtual machines", C. Clark, K. Fraser, S. Hand, J. C. Hansen, E. Jul, C. Limpach, I. Pratt, A. Warfield, Proceedings of the 2nd ACM/USENIX Symposium on Networked Systems Design and Implementation (NSDI), Boston, Mass., May 2005.

The migration process includes transferring multiple memory pages that may store the state information representative of the state of the virtual machine. The push technique includes sending memory pages from source computer 50 to storage controller 10 while the relevant virtual machine continues running on source computer 50. Memory pages modified during the migration are re-sent from source computer 50 to storage controller 10. The stop-and-copy technique includes stopping a virtual machine that was running on source computer 50, sending all the relevant memory pages from source computer 50 to storage controller 10 and then (after the completion of the sending stage) starting the virtual machine on storage controller 10. The pull technique involves starting to run the virtual machine on storage controller 10 even before all relevant memory pages are transferred to storage controller 10. When the virtual machine requests to access a memory page that was not provided to storage controller this memory page is sent from source computer 50 to storage controller 10. The pre-copy technique includes a bounded iterative push phase that is followed by a very short stop-and-copy phase. During each iteration newly amended memory pages are sent from source computer 50 to storage controller 10. These same techniques can also be applied when migrating a group of processes.

Figure 2:
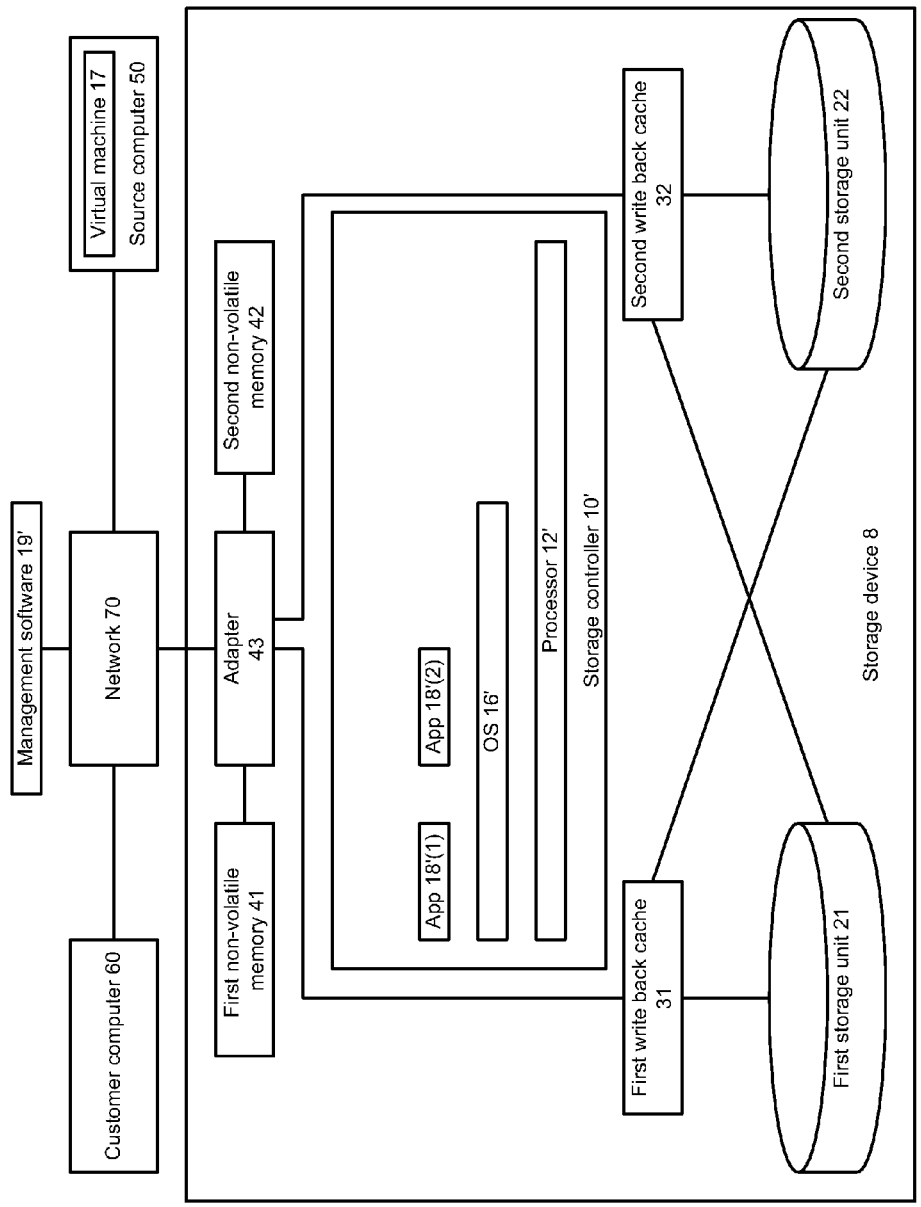
FIG. 2 illustrates a storage controller according to another embodiment of the invention.

FIG. 2 illustrates storage controller 10' according to another embodiment of the invention.

Storage controller 10' differs from storage controller 10 by not including a management entity such as management software 19. Management entity 19' is connected to source computer 50 and to storage controller 10'. In addition, storage controller 10' includes processor 12' that can execute operating system 16' and applications such as applications 16'(1) and 16'(2) and is capable of supporting group of processes migration but not virtual machine migration.

Figure 3:
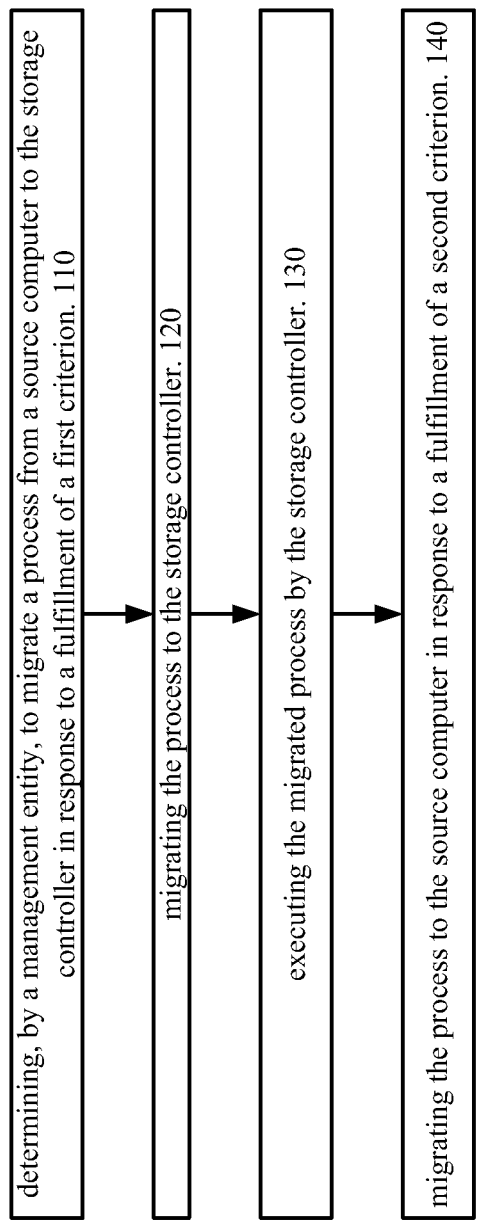
FIG. 3 is a flow chart of a method for executing a migrated execution context by a storage controller, according to an embodiment of the invention.

FIG. 3 is a flow chart of method 100 for executing a migrated execution context by a storage controller, according to an embodiment of the invention.

Method 100 starts by stage 110 of determining, by a management entity, to migrate an execution context from a source computer to the storage controller in response to a fulfillment of a first criterion. It is noted that the source computer is connected to the storage controller. Conveniently, the first criterion reflects an expected improvement of a throughput of the storage controller to be gained by the migration. Conveniently, the first criterion further reflects an expected migration penalty. Conveniently, the first criterion prevents processes that are characterized by a low data transfer level from being migrated to the storage controller.

Referring to the example set fourth in FIG. 1, management entity 19 can determine to migrate a virtual machine or a group of processes from source computer 50 to storage controller 10. It is noted that the management entity is not necessarily a pure software entity and that that it can be at least partially installed (or positioned) outside storage controller 10.

Stage 110 is followed by stage 120 of migrating the execution context to the storage controller. Stage 120 can include migrating a virtual machine, migrating a group of processes and the like. It is noted that various well known migration techniques can be applied, including push technique, stop-and-copy technique, pull technique, pre-copy technique or a combination thereof.

Stage 120 is followed by stage 130 of executing the migrated execution context by the storage controller. Conveniently, the execution of the migrated execution context starts after at least a portion of state information representative of a state of the execution context was received by the storage controller.

Stage 130 is followed by stage 140 of migrating the execution context to the source computer in response to a fulfillment of a second criterion. The second criterion can represent a completion of the process, decrease in the gain achieved by the migration process, other processes that should be migrated, and the like.

Figure 4:
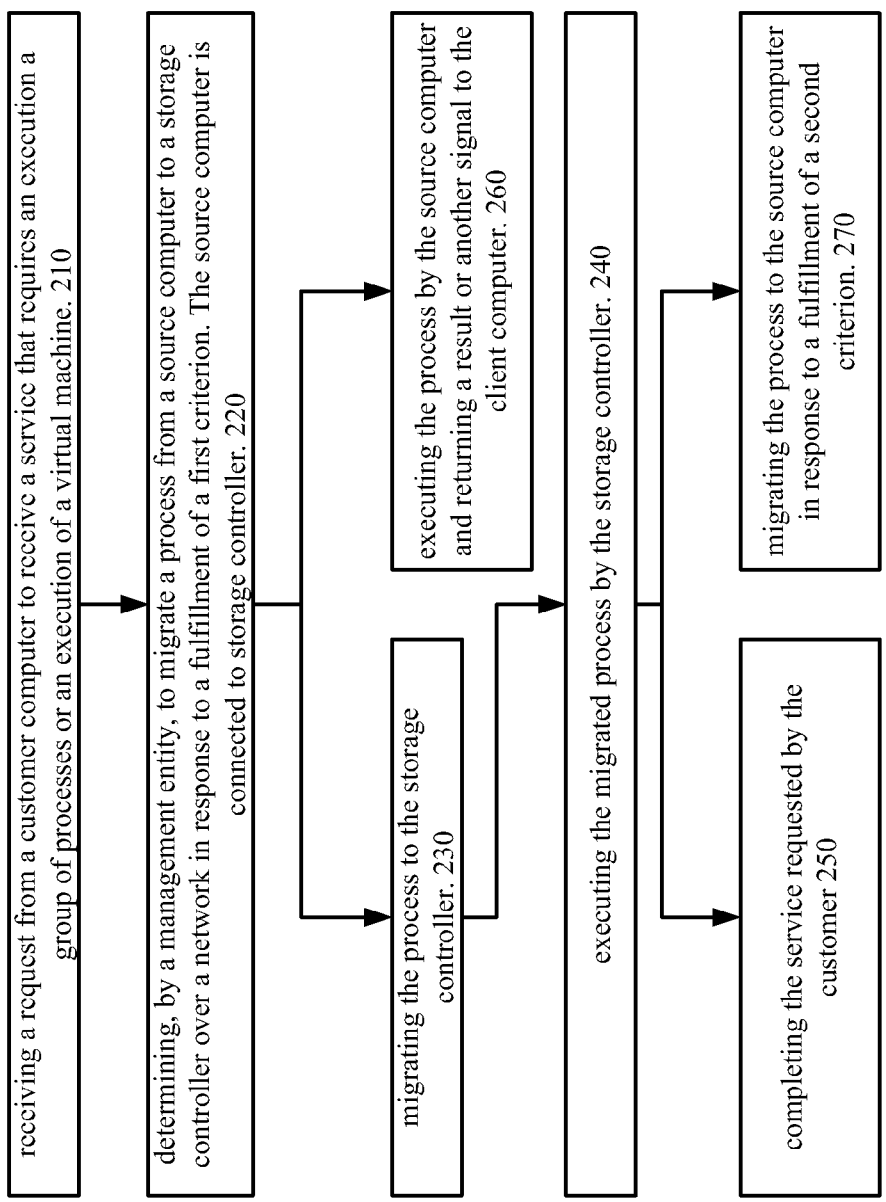
FIG. 4 is a flow chart of a method for providing a service over a network, according to an embodiment of the invention.

FIG. 4 is a flow chart of method 200 for providing a service to a client over a network, according to an embodiment of the invention.

Method 200 starts by stage 210 of receiving a request from a customer computer to receive a service that requires an execution a group of processes or an execution of a virtual machine. Referring to the example set forth in FIG. 1 the request is sent from customer computer 60 via network 70 to a management entity such as but not limited to management software 19.

Stage 210 is followed by stage 220 of determining, by a management entity, to migrate an execution context from a source computer to a storage controller over a network in response to a fulfillment of a first criterion. It is noted that the source computer is connected to storage controller. Conveniently, the first criterion reflects an expected improvement of a throughput of the storage controller to be gained by the migration. Conveniently, the first criterion further reflects an expected migration penalty. Conveniently, the first criterion prevents processes that are characterized by a low data transfer level from being migrated to the storage controller.

Referring to the example set fourth in FIG. 1, management entity 19 can determine to migrate the virtual machine or the group of processes from source computer 50 to storage controller 10. It is noted that the management entity is not necessarily a pure software entity and that that it can be at least partially installed (or positioned) outside storage controller 10.

Stage 220 is followed by stage 230 of migrating the execution context to the storage controller, if the management entity determined that a migration is required. Else (if the first criterion was not fulfilled) stage 220 is followed by stage 260 of executing the execution context by source computer and returning a result or another signal to the client computer.

Stage 230 can include migrating a virtual machine, migrating a group of processes and the like. It is noted that various well known migration techniques can be applied, including push technique, stop-and-copy technique, pull technique, pre-copy technique or a combination thereof.

Stage 230 is followed by stage 240 of executing the migrated execution context by the storage controller. Conveniently, the execution of the migrated execution context starts after at least a portion of state information representative of a state of the execution context was received by the storage controller.

Stage 240 is followed by stage 250 of completing the service requested by the customer. Stage 250 usually includes sending a result to the customer computer.

Stage 240 is also followed by stage 270 of migrating the execution context to the source computer in response to a fulfillment of a second criterion.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Conveniently, a computer program product is provided. The computer program product includes a computer usable medium including a computer readable program, wherein the computer readable program when executed on a computer (such as a source computer 50, a processor within storage controller 10 or another computer connected to the storage controller) causes the computer to: determine to migrate an execution context from a source computer to the storage controller in response to a fulfillment of a first criterion; wherein the source computer is coupled to the storage controller; and to enable a migration of the execution context to the storage controller.

Conveniently, the first criterion reflects an expected improvement in a throughput of the storage controller to be gained by the migration.

Conveniently, the first criterion further reflects an expected migration penalty.

Conveniently, the first criterion prevents processes that are characterized by a low data transfer level from being migrated to the storage controller.

Conveniently, the computer program product, when executed on a computer causes the computer to determine to migrate a virtual machine from the source computer.

Conveniently, the computer readable program when executed on a computer causes the computer to determine to migrate the execution context from the storage controller to the first computer in response to a fulfillment of a second criterion.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A method for migrating an execution context, the method comprising:
   determining that migrating an execution context from a source computer to a storage controller that is connected to the source computer will result in an expected improvement of performance of said storage controller, wherein said storage controller is dedicated to controlling access to a data storage unit and
      wherein said execution context includes an operation that is to be performed on data stored at said data storage unit;
   migrating the execution context to the storage controller;
   executing the migrated execution context at the storage controller; and
   migrating the execution context from the storage controller back to the source computer after the operation is performed.

2. The method according to claim 1 wherein the executing step comprises executing after at least a portion of state information representative of a state of the execution context was received by the storage controller.

3. The method according to claim 1 wherein said expected improvement of performance of said storage controller is an expected improvement of a throughput measurement.

4. The method according to claim 1 wherein said expected improvement of performance of said storage controller is an improvement of an expected time to complete the computation of an I/O-bound task.

5. The method according to claim 1 wherein said expected improvement of performance of said storage controller is an expected power consumption reduction.

6. The method according to claim 1 wherein any of the steps of migrating an execution context comprises migrating a virtual machine.

7. The method according to claim 1 wherein any of the steps of migrating an execution context comprises migrating a group of processes.

8. A computer program product comprising:
a computer readable medium; and
computer readable program instructions, wherein the computer readable program instructions when executed on a computer cause the computer to
determine that migrating an execution context from a source computer to a storage controller that is connected to the source computer will result in an expected improvement of performance of said storage controller,
wherein said storage controller is dedicated to controlling access to a data storage unit, and
wherein said execution context includes an operation that is to be performed on data stored at said data storage unit,
migrate the execution context to the storage controller, and
migrate the execution context from the storage controller back to the source computer after the operation is performed,
wherein said computer readable medium includes any physically-tangible apparatus that stores said program instructions, and
wherein said program instructions are stored on said computer readable medium.

9. The computer program product according to claim 8, wherein the computer readable program instructions enable the migration of the execution context to the storage controller when said expected improvement of performance of said storage controller is an expected improvement in a throughput measurement.

10. The computer program product according to claim 8, wherein the computer readable program instructions enable the migration of the execution context to the storage controller when said expected improvement of performance of said storage controller is an expected time to complete the computation of an IO-bound task.

11. The computer program product according to claim 8, wherein the computer readable program instructions enable the migration of the execution context to the storage controller when said expected improvement of performance of said storage controller is an expected power consumption reduction.

12. The computer program product according to claim 8, wherein the computer readable program instructions enable the migration of a virtual machine from the source computer.

13. A storage controller, comprising:
a processor; and
a data storage unit,
wherein the processor is configured to participate in the migration of an execution context from a source computer to said processor, wherein said storage controller is connected to said source computer, when it is determined that migrating said execution context from said source computer to said processor will result in an expected improvement of performance of said storage controller,
wherein said execution context includes an operation that is to be performed on data stored at said data storage unit,
wherein the processor is configured to execute the execution context, and
wherein the processor is configured to participate in the migration of the execution context from the processor to the source computer after the operation is performed.

14. The storage controller according to claim 13 wherein the processor is configured to participate in said determination of said expected improvement of performance of said storage controller.

15. The storage controller according to claim 14 wherein said expected improvement of performance of said storage controller is an expected improvement of a throughput.

16. The storage controller according to claim 14 wherein said expected improvement of performance of said storage controller is at least one of
a) an expected time to complete the computation of an IO-bound task or
b) an expected power consumption reduction.

17. The storage controller according to claim 13 wherein the processor is configured to execute the migrated execution context after at least a portion of state information representative of a state of said process is received by the processor.

* * * * *